US011911835B2

(12) United States Patent
Semnisky et al.

(10) Patent No.: US 11,911,835 B2
(45) Date of Patent: Feb. 27, 2024

(54) LIGHTWEIGHT ROTARY CUTTING TOOL

(71) Applicant: Kennametal Inc., Latrobe, PA (US)

(72) Inventors: Logan M. Semnisky, Greensburg, PA (US); Alan J. Bookheimer, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 89 days.

(21) Appl. No.: 17/702,399

(22) Filed: Mar. 23, 2022

(65) Prior Publication Data

US 2023/0302554 A1 Sep. 28, 2023

(51) Int. Cl.
*B23C 5/08* (2006.01)
*B23C 5/20* (2006.01)
*B23C 5/00* (2006.01)

(52) U.S. Cl.
CPC .............. *B23C 5/08* (2013.01); *B23C 5/202* (2013.01); *B23C 5/006* (2013.01); *B23C 2210/168* (2013.01)

(58) Field of Classification Search
CPC .. B23C 5/08; B23C 5/202; B23C 5/06; B23C 5/006; B23C 5/20; B23C 5/22; B23C 2210/246; B23C 5/26; B23C 2210/168; B23C 2240/24
See application file for complete search history.

(56) References Cited

U.S. PATENT DOCUMENTS

| 2,828,529 A | 4/1958 | Bryant |
| 5,135,337 A | 8/1992 | Adamson |
| 5,152,640 A | 10/1992 | Regis et al. |

(Continued)

FOREIGN PATENT DOCUMENTS

| CN | 102089103 A | 6/2011 |
| CN | 205967563 U | 2/2017 |

(Continued)

OTHER PUBLICATIONS

Jun. 6, 2022 Office action (3 months) (US Only) U.S. Appl. No. 17/115,997.

(Continued)

*Primary Examiner* — Sara Addisu
(74) *Attorney, Agent, or Firm* — Larry R. Meenan

(57) ABSTRACT

A rotary cutting tool includes a disc-like central body having an outer peripheral surface. A peripheral support member extends circumferentially along the peripheral outer surface of the disc-like central body and provides support against centrifugal and cutting forces exerted on an insert pocket during a cutting operation. A radial support member extends radially along the disc-like central body to the peripheral support member. The radial support member structurally interacts with the peripheral support member to provide additional support for the insert pocket against centrifugal and cutting forces exerted on the insert pocket during a cutting operation. The radial support member and the peripheral support member have a three-dimensional topology that maximizes a stiffness-to-weight ratio of the rotary cutting tool. The rotary cutting tool may include a second radial support member extending radially along the disc-like central body to the peripheral support member.

14 Claims, 9 Drawing Sheets

(56) References Cited

U.S. PATENT DOCUMENTS

| | | | |
|---|---|---|---|
| 5,605,420 A | 2/1997 | Feldsine | |
| 5,921,727 A | 7/1999 | Depperman | |
| 5,934,842 A | 8/1999 | Gupta | |
| 6,120,218 A | 9/2000 | Bishop | |
| 6,655,883 B2 | 12/2003 | Maar | |
| 6,890,132 B1 | 5/2005 | Baron et al. | |
| 6,913,428 B2 | 7/2005 | Kress | |
| 8,545,134 B2* | 10/2013 | Frank | B23B 29/0341 407/46 |
| 8,764,354 B2 | 7/2014 | Schuffenhauer et al. | |
| 8,950,985 B2 | 2/2015 | Durand-Terrasson | |
| 9,004,822 B2* | 4/2015 | Francis | B23C 5/06 407/66 |
| 9,056,357 B2 | 6/2015 | Bozkurt | |
| 9,216,461 B2 | 12/2015 | Athad | |
| 9,283,624 B2 | 3/2016 | Freyermuth et al. | |
| 9,573,199 B2 | 2/2017 | Baratta | |
| 9,623,494 B2 | 4/2017 | Bozkurt | |
| 10,449,609 B2 | 10/2019 | Baratta | |
| 10,464,138 B2 | 11/2019 | Kozaki et al. | |
| 10,799,960 B2 | 10/2020 | Zetek et al. | |
| 10,940,551 B1* | 3/2021 | Semnisky | B23C 5/006 |
| 11,203,073 B2 | 12/2021 | Parendo et al. | |
| 11,203,074 B2 | 12/2021 | Bek et al. | |
| 11,504,784 B2* | 11/2022 | Semnisky | B23D 77/02 |
| 11,534,841 B2 | 12/2022 | Maksimovic et al. | |
| 11,571,759 B2* | 2/2023 | Semnisky | B23D 77/006 |
| 2005/0019110 A1 | 1/2005 | Astrakhan | |
| 2011/0182676 A1 | 7/2011 | Frank et al. | |
| 2011/0188954 A1 | 8/2011 | Frank | |
| 2012/0251254 A1 | 10/2012 | Durand-Terrasson | |
| 2013/0136551 A1 | 5/2013 | Nisikawa | |
| 2013/0156520 A1 | 6/2013 | Hacker et al. | |
| 2014/0161543 A1 | 6/2014 | Francis et al. | |
| 2014/0227047 A1 | 8/2014 | Oettle et al. | |
| 2017/0151614 A1* | 6/2017 | Woodruff | B23C 5/2226 |
| 2017/0252839 A1 | 9/2017 | Donisi et al. | |
| 2019/0099816 A1* | 4/2019 | Zetek | B23C 5/22 |
| 2019/0314903 A1 | 10/2019 | Haenle et al. | |
| 2019/0314904 A1 | 10/2019 | Haenle | |
| 2020/0055129 A1 | 2/2020 | Leuze et al. | |
| 2021/0060665 A1 | 3/2021 | Semnisky et al. | |
| 2022/0023960 A1 | 1/2022 | Ljatifi et al. | |
| 2022/0176473 A1 | 6/2022 | Semnisky et al. | |
| 2022/0176480 A1 | 6/2022 | Semnisky et al. | |

FOREIGN PATENT DOCUMENTS

| | | | |
|---|---|---|---|
| CN | 109070245 A | 12/2018 | |
| CN | 209139934 U | 7/2019 | |
| DE | 19934125 | 1/2001 | |
| DE | 10305991 A1 | 12/2004 | |
| DE | 10359854 A1 | 7/2005 | |
| DE | 102007007399 A1 | 8/2008 | |
| DE | 102009022051 B3 | 9/2010 | |
| DE | 102011016921 A1 * | 10/2012 | B23C 5/06 |
| DE | 102017118604 A1 | 2/2018 | |
| DE | 102020111782 A1 | 5/2021 | |
| EP | 0074542 A2 | 3/1983 | |
| EP | 0074542 A3 | 6/1984 | |
| EP | 1 984 135 B1 | 10/2008 | |
| EP | 1984135 A1 | 10/2008 | |
| EP | 2301702 A1 | 3/2011 | |
| EP | 2974817 A1 * | 1/2016 | B23C 5/06 |
| EP | 3772384 A1 | 2/2021 | |
| EP | 3785835 A1 | 3/2021 | |
| EP | 3819055 A1 | 5/2021 | |
| FR | 2927555 A3 | 8/2009 | |
| FR | 2967366 A1 | 5/2012 | |
| JP | 2006015444 A | 1/2006 | |
| JP | 4654622 B2 | 3/2011 | |
| JP | 2017030075 A | 2/2017 | |
| JP | 2018149655 A | 9/2018 | |
| JP | 2018149656 A | 9/2018 | |
| WO | WO1987004969 A1 | 8/1987 | |
| WO | 2010/020234 A1 | 8/2009 | |
| WO | WO2010097082 A1 | 9/2010 | |
| WO | WO2012101319 A1 | 8/2012 | |
| WO | 2017083192 A1 | 5/2017 | |
| WO | WO2019002050 A1 | 1/2019 | |
| WO | WO2020118460 A1 | 6/2020 | |
| WO | WO2021023489 A1 | 2/2021 | |
| WO | 2022105953 A2 | 5/2022 | |

OTHER PUBLICATIONS

Jul. 21, 2022 Notice of Allowance US App. No. 20220176473.
Sep. 16, 2023 Foreign Office Action Chinese Application No. CN202180081345, 2 Pages.
Sep. 16, 2023 Foreign Office Action Chinese Application No. CN202180083118, 2 Pages.
Sep. 7, 2023 Notice of Allowance U.S Appl. No. 17/374,263, 8 Pages.
Jun. 28, 2023 Non-Final Office Action U.S. Appl. No. 17/374,263, 12 Pages.
International Preliminary Report on Patentability for International Application No. PCT/US2021/062322, dated Jun. 22, 2023, 8 Pages.
International Preliminary Report on Patentability for International Application No. PCT/US2021/062367, dated Jun. 22, 2023, 7 Pages.
Aug. 18, 2023 Foreign Office Action European Application No. EP20200190517, 38 Pages.
Aug. 22, 2023 Final Office Action U.S. Appl. No. 17/374,263, dated Aug. 22, 2023, 7 Pages.
Apr. 15, 2023 Foreign Office Action Chinese Application No. CN202010751992.7, 20 Pages.
International Search Report and Written Opinion for International Application No. PCT/US2023/011419, dated May 22, 2023, 8 Pages.
Extended European Search Report for European Application No. 23163767.9, dated Jul. 8, 2023, 38 Pages.
Jul. 27, 2022 Final Office Action (US Only) US App. No. 20220176480, 14 pages.
Aug. 24, 2022 Advisory Action (PTOL-303) 1 US App. No. 20220176480, 5 pages.
Sep. 29, 2022 Notice of Allowance U.S. Appl. No. 17/116,782, 8 pages.
"Special Light Milling Head Produced by 3D Metal Printing", Regional Technological Institute, Faculty of Mechanical Engineering, University of West Bohemia, Univerzitni 8, 306, 14 Plzen, Czech Republic.
Apr. 12, 2022 International Search Report WO App. No. PCT/US2021/062367.
Mar. 30, 2022 International Search Report WO App. No. PCT/US2021/062322.
Apr. 13, 2022 Office action (3 months) (US Only) U.S. Appl. No. 17/116,782.
Jan. 29, 2021 Search report EP App. No. 20190517.1.
Nov. 5, 2020 Notice of Allowance U.S. Appl. No. 16/557,533.
Sep. 28, 2023 Notice of Allowance for U.S. Appl. No. 17/374,263, 2 Pages.

* cited by examiner

LIGHTWEIGHT ROTARY CUTTING TOOL

FIELD OF THE DISCLOSURE

In general, the disclosure relates to rotary cutting tools for performing machining operations on a workpiece. In particular, the disclosure relates to a lightweight rotary cutting tool with an increased stiffness-to-weight ratio as compared to conventional rotary cutting tools.

BACKGROUND OF THE DISCLOSURE

In certain machining applications, the weight of the cutting tool can become a significant constraint. Heavy tools are problematic for operators who must handle the tools. Workplace safety requirements are also decreasing the maximum weight that an employee is permitted to manually lift. Many customers use manually loaded machines (such as gantry machines) where the operators must manually lift the tooling assembly into the spindle. Therefore, additional weight restrictions have created a customer requirement to make cutting tools as light weight as possible without compromising performance. The challenge in decreasing weight of cutting tools is maintaining stiffness while using less material. The methodology of design for lightweight cutting tools requires minimizing material by optimally placing material in line with the resultant load vectors that act on the cutter.

In addition, the time to accelerate and decelerate the tool to its desired speed decreases with reduced tool weight and moment of inertia. Further, many machines with automatic tool changers also have weight and tilting moment limits for tools the machine can change. Even further, heavy cutting tools can cause issues with tool change efficiency or even result in poor machining quality if the tilting moment of the tool is too high for the machine connection. Thus, there is a need to minimize the weight of heavy conventional cutting tools, while retaining adequate stiffness, to allow for easier handling and reduced operating costs.

SUMMARY OF THE DISCLOSURE

The problem of reducing the weight of a rotary cutting tool, such as a milling cutter, and the like, is solved by using a topology optimization technique combined with additive manufacturing (i.e., 3D printing) to produce a support structure that drastically reduces the overall weight of the rotary cutting tool, while maintaining the strength, stiffness in the tangential, axial and radial directions, and functionality of the rotary cutting tool.

Topology optimization uses a finite element analysis (FEA) or a finite element method (FEM) to optimize the distribution of material in a structure for a given volume based on the applied loads and constraints. The current proliferation of 3D printer technology has allowed designers and engineers to use topology optimization techniques when designing new products. Topology optimization combined with additive manufacturing (i.e., 3D printing) can result in lightweight, improved structural performance and a shortened design-to-manufacturing cycle.

The rotary cutting tool described in this disclosure has a topology optimized structure resulting in a higher stiffness-to-weight ratio for the given material, volume, and loads/constraints as compared to a conventional cutting tool. Topology optimized structures have complex geometry that is now possible to create directly by using additive manufacturing (i.e., 3D printing).

In one aspect, a rotary cutting tool comprises a disc-like central body having an outer peripheral surface. A peripheral support member extends circumferentially along the peripheral outer surface of the disc-like central body and provides support against centrifugal and cutting forces exerted on an insert pocket during a cutting operation. A radial support member extends radially along the disc-like central body to the peripheral support member. The radial support member structurally interacts with the peripheral support member to provide additional support for the insert pocket against centrifugal and cutting forces exerted on the insert pocket during a cutting operation. The radial support member and the peripheral support member have a three-dimensional topology that maximizes a stiffness-to-weight ratio of the rotary cutting tool.

In another aspect, a rotary cutting tool comprises a disc-like central body having an outer peripheral surface. A peripheral support member extends along the peripheral outer surface of the disc-like central body. The peripheral support member comprises a continuous surface extending on both sides of the insert pocket with a leading portion with respect to a direction of rotation, R, of the rotary cutting tool and a trailing portion with respect to a direction of rotation, R, of the rotary cutting tool. The peripheral support member has a three-dimensional topology that maximizes a stiffness-to-weight ratio of the rotary cutting tool.

BRIEF DESCRIPTION OF THE DRAWINGS

While various embodiments of the disclosure are illustrated, the particular embodiments shown should not be construed to limit the claims. It is anticipated that various changes and modifications may be made without departing from the scope of this disclosure.

DETAILED DESCRIPTION OF THE DISCLOSURE

Figure 1:
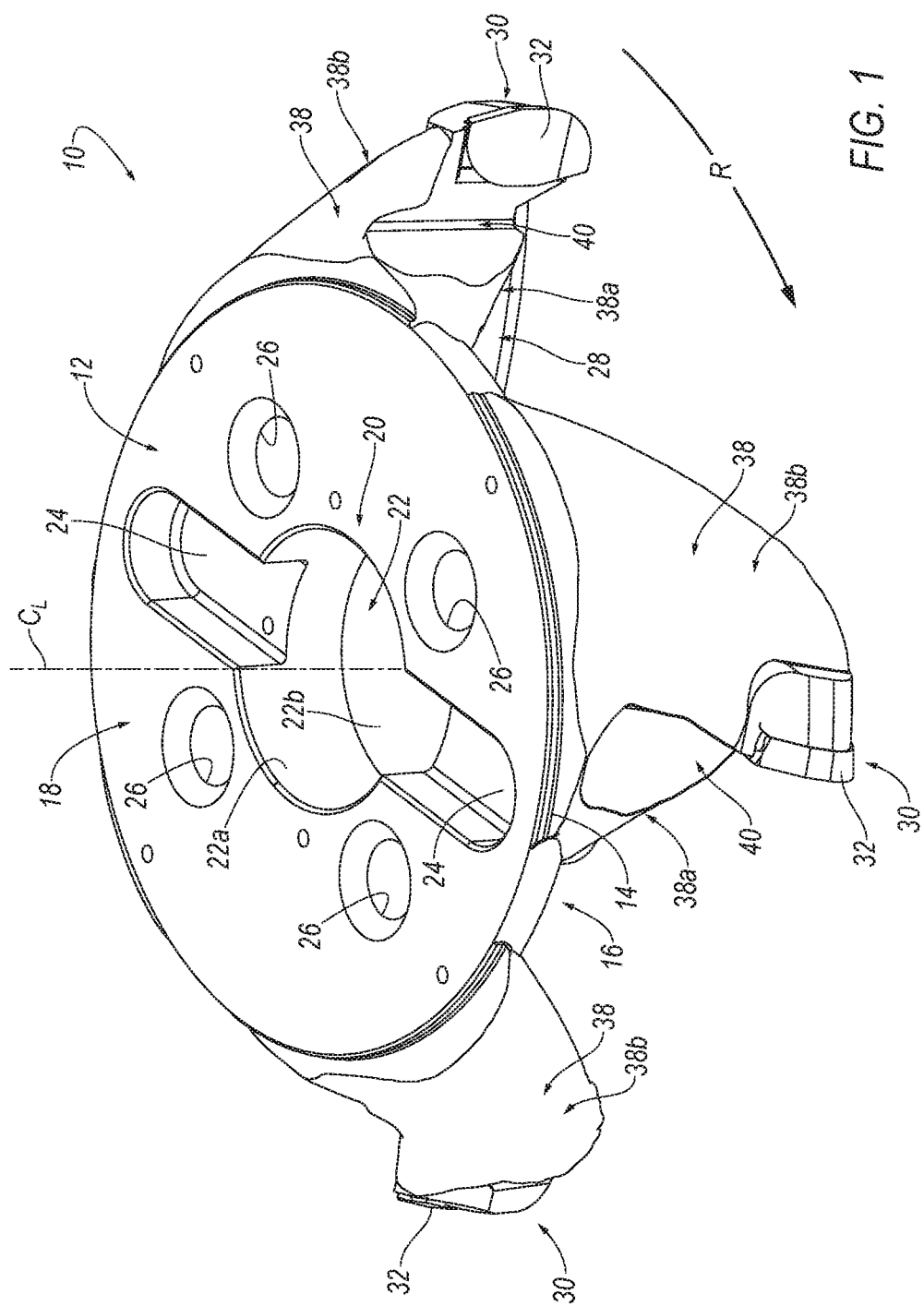
FIG. 1 is a rear isometric view of a rotary cutting tool according to an embodiment of the disclosure.

As used herein, directional phrases, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "arcuate" is defined as curved, like a bow.

As used herein, the term "axial" or "axially" is defined as being in a direction substantially parallel to the central axis, $C_L$.

As used herein, the term "radial" or "radially" is defined as being in a direction substantially perpendicular to the central axis, $C_L$.

As used herein, the term "3D printing" or "additive manufacturing" is the construction of a three-dimensional object from a CAD model or a digital 3D model. The term "3D printing" can refer to a variety of processes in which material is deposited, joined or solidified under computer control to create a three-dimensional object, with material being added together, such as liquid molecules or powder grains being fused together, typically layer by layer. In the 1980s, 3D printing techniques were considered suitable only to the production of functional or aesthetical prototypes and, back then, a more comprehensive term for 3D printing was rapid prototyping. Today, the precision, repeatability and material range have increased to the point that 3D printing is considered as an industrial production technology, with the official term of "additive manufacturing".

As used herein, the term "topology" is defined as the way in which constituent parts are interrelated or arranged.

As used herein, the phrase "topology optimization" is defined as a mathematical method that optimizes material layout within a given design space, for a given set of loads, boundary conditions and constraints with the goal of maximizing the performance of the system. Topology optimization is different from shape optimization and sizing optimization in the sense that the design can attain any shape within the design space, instead of dealing with predefined configurations.

Conventional topology optimization techniques use a finite element analysis (FEA) or a finite element method (FEM) to evaluate the design performance. The design is optimized using either gradient-based mathematical programming techniques, such as the optimality criteria algorithm and the method of moving asymptotes or non-gradient-based algorithms, such as genetic algorithms. There are a variety of commercially available software programs for topology optimization including, but not limited to, Ansys Mechanical, Altair Inspire, Siemens NX, and Solidworks.

In general, the lightweight rotary cutting tool of the disclosure is produced by additive manufacturing in which the cutting region is supported by a peripheral support structure proximate the insert pocket and has a structure that results in a lightweight cutting tool with an optimal stiffness-to-weight ratio. In addition, the rotary cutting tool of the disclosure includes optimally placed radial support structures that extend from the connection interface to the insert pocket. Both of these support structures primarily resist deformation due to the rotational velocity of the rotary cutting tool and deformation due to cutting forces applied to the cutting tool.

Referring now to FIGS. 1-9, a rotary cutting tool 10 is shown according to an embodiment of the disclosure. In the illustrated embodiment, the rotary cutting tool 10 comprises a face milling cutter that rotates in a direction of rotation, R, about a central axis, $C_L$, during a cutting operation. Although the rotary cutting tool 10 comprises a face milling cutter in the illustrated embodiment, it should be appreciated that the principles of the disclosure can be applied to any rotary cutting tool for metal cutting operations, such as any milling cutter, rotary boring bar, reamer, and the like. In addition, the description herein of specific applications should not be a limitation on the scope and extent of the use of the rotary cutting tool.

In general, the rotary cutting tool 10 is integrally formed and comprises a disc-like central body 12 and an outer peripheral surface 14. The central body 12 has a forward end 16 that faces in an axially forward direction during a cutting operation, and a rearward end 18 that faces an axially rearward direction during a cutting operation. The central body 12 includes a coupling interface 20 having a central cavity 22 and a pair of keyways 24 extending radially outward from the central cavity 22 on opposite sides of the cavity 22. The central cavity 22 and the keyways 24 act as a guide to properly position the rotary cutting tool 10 to machine mounting member, such as an adapter (not shown).

Figure 2:
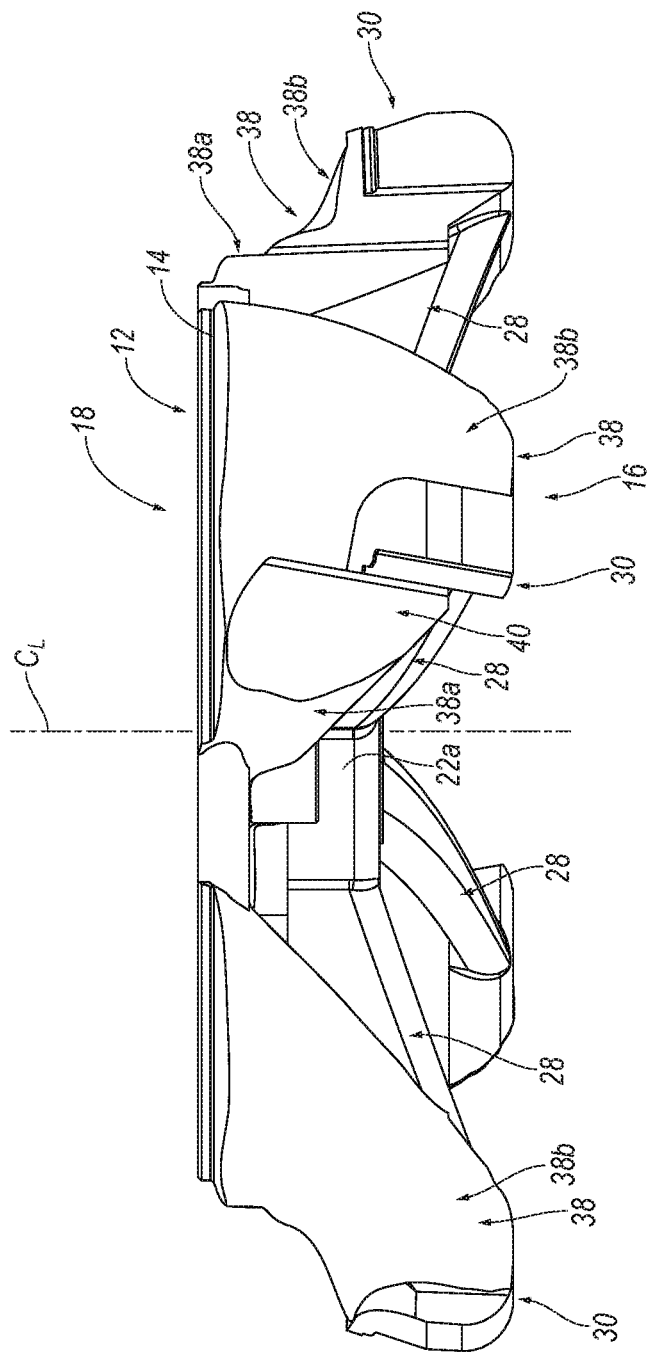
FIG. 2 is a side view of the rotary cutting tool of FIG. 1.
Figure 3:
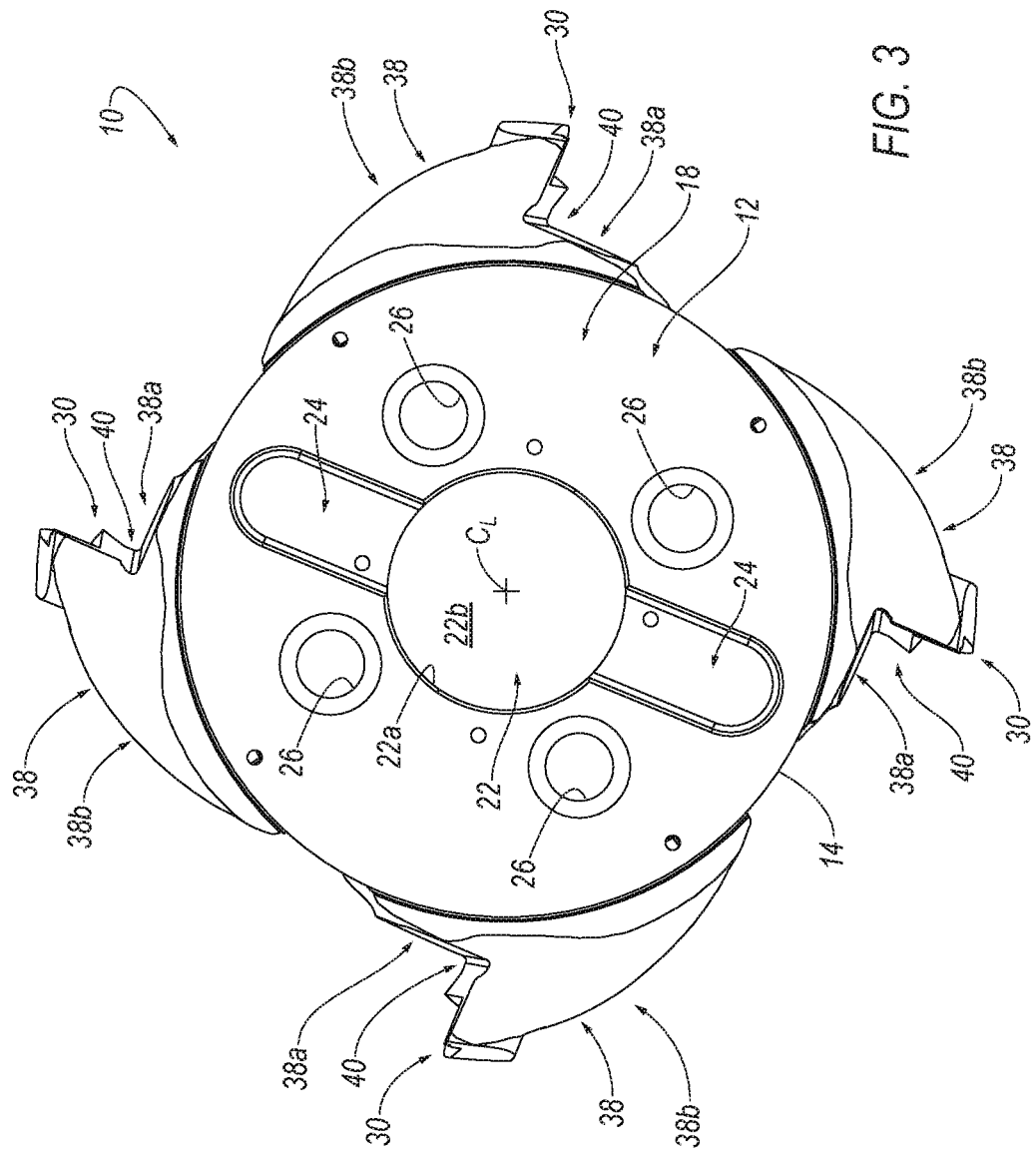
FIG. 3 is a rear view of the rotary cutting tool of FIG. 1.

The central cavity 22 has a substantially circular side wall 22a and a bottom wall 22b to increase the radial stiffness of the rotary cutting tool 10. It is noted that the cavity 22 is recessed into the central body 12 when viewed from the rearward end 18 of the rotary cutting tool 10, as shown in FIG. 1, and protrudes from the central body 12 when viewed from the forward end 16 of the rotary cutting tool 10, as shown in FIG. 2. The rotary cutting tool 10 may be mounted to the adapter (not shown) by using one or more mounting holes 26 formed through the central body 12.

The rotary cutting tool 10 includes a plurality of radial support members 28 integrally formed with the disc-like central body 12. Specifically, each radial support member 28 extends radially along the disc-like central body 12 from the central cavity 22 to a peripheral support member 38 in the vicinity of the insert pocket 30, as shown in FIGS. 1 and 2. The radial support members 28 provide support for the insert pocket 30 against centrifugal and cutting forces exerted on the cutting insert 32 during a cutting operation.

In the illustrated embodiment, the rotary cutting tool 10 has a total of four radial support members 28 and four insert pockets 30 (i.e., a one-to-one correspondence). However, it will be appreciated that the invention is not limited to the number of radial support members 28 and insert pockets 30, and that the invention can be practiced with any desirable number of radial support members 28 and insert pockets 30, depending on the dimensions of the rotary cutting tool 10 and application requirements.

Figure 4:
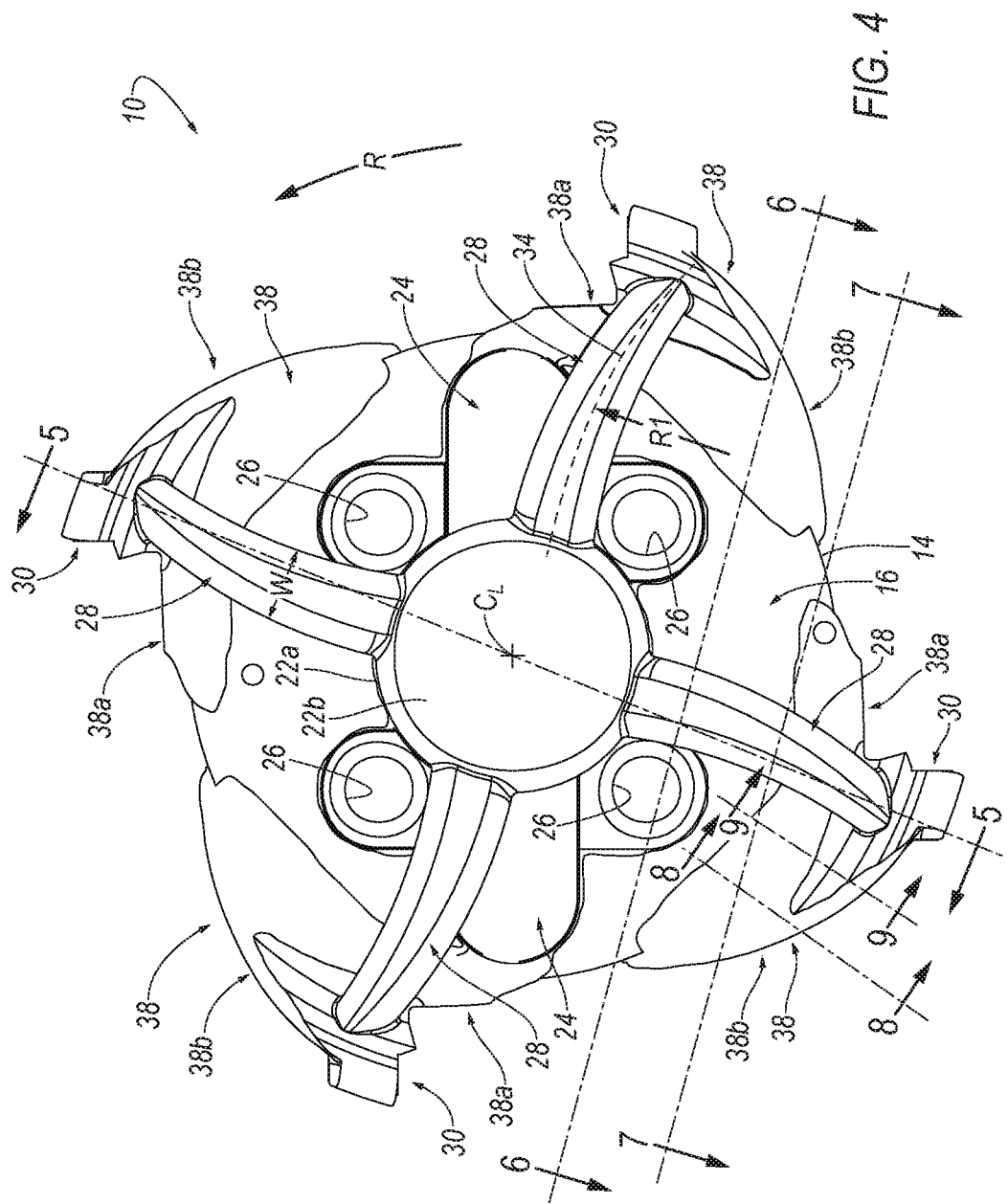
FIG. 4 is a front view of the rotary cutting tool of FIG. 1.

As shown in FIG. 4, each radial support member 28 has a central line 34 with a radius of curvature, R1. In the illustrated embodiment, the central line 34 of the radial support member 28 is curved away from the direction of rotation, R, of the rotary cutting tool 10. In the illustrated embodiment, one end of the radial support member 28 extends from the side wall 22a of the central cavity 22 to the vicinity of the insert pocket 30.

Figure 5:
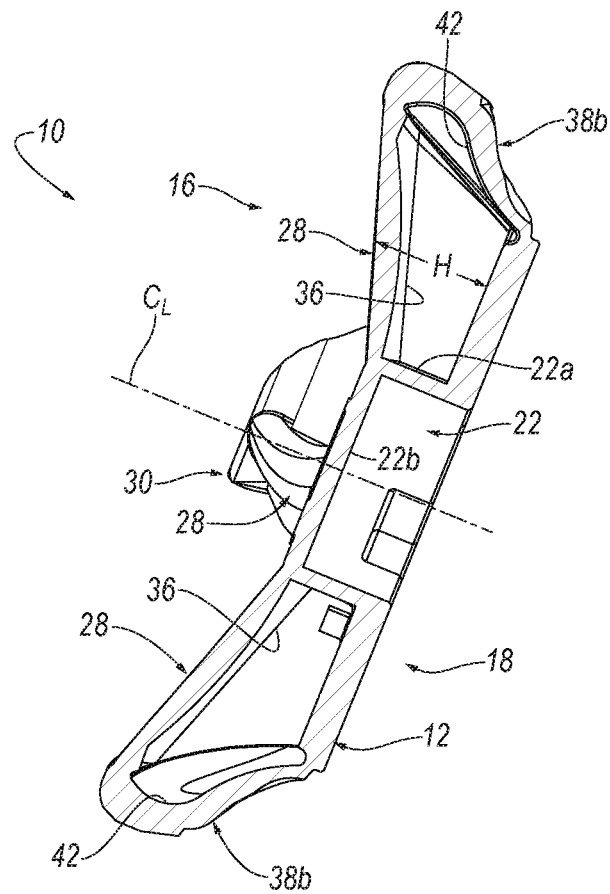
FIG. 5 is a cross-sectional view of the rotary cutting tool taken along line 5-5 of FIG. 4.
Figure 6:
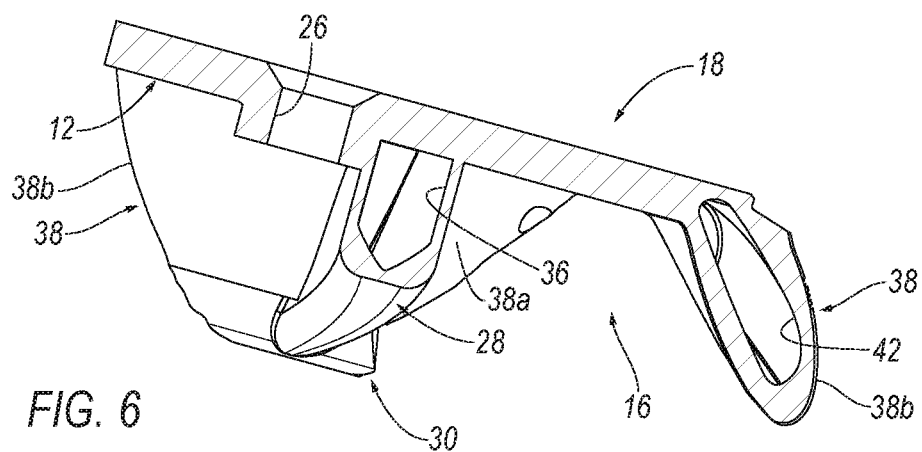
FIG. 6 is a cross-sectional view of the rotary cutting tool taken along line 6-6 of FIG. 4.
Figure 7:
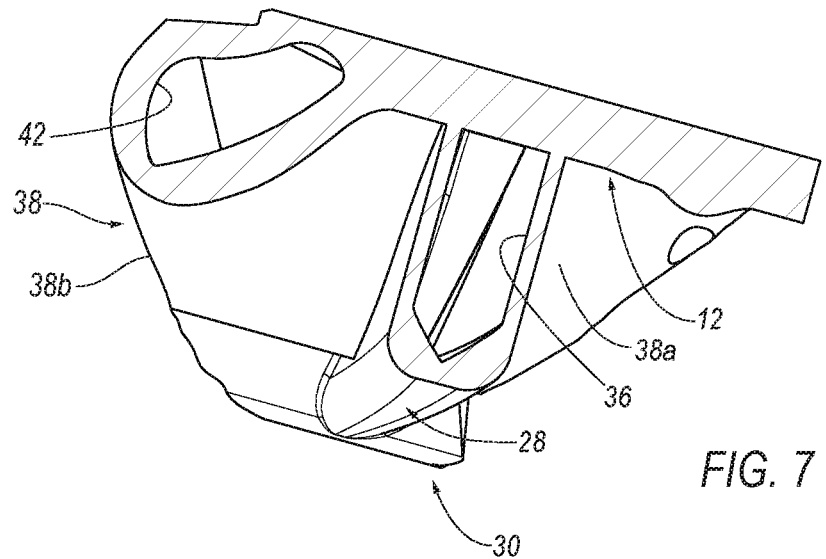
FIG. 7 is a cross-sectional view of the rotary cutting tool taken along line 7-7 of FIG. 4.
Figures 8, 9:
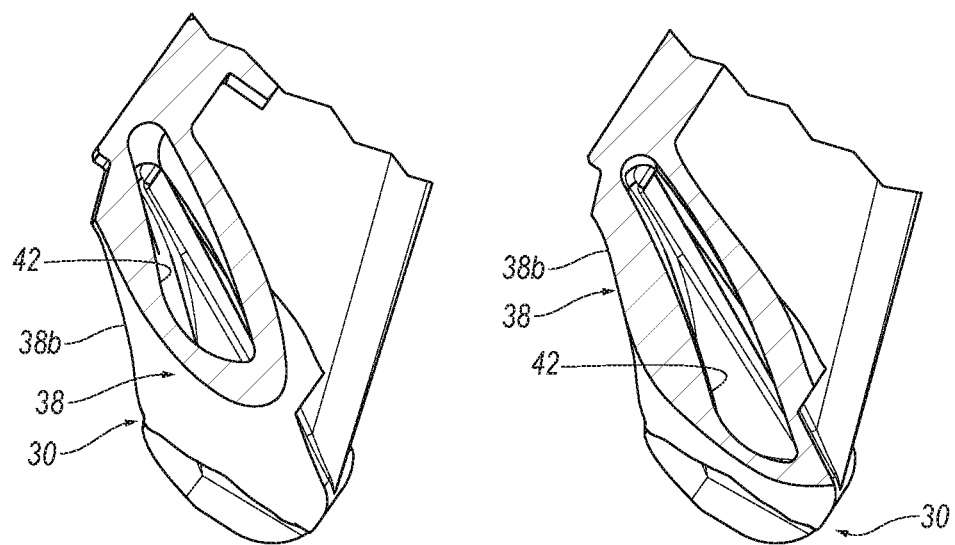
FIG. 8 is a cross-sectional view of the rotary cutting tool taken along line 8-8 of FIG. 4.
FIG. 9 is a cross-sectional view of the rotary cutting tool taken along line 9-9 of FIG. 4.

As shown in FIG. 5, each radial support member 28 has a height, H, that varies along its length. Specifically, the height, H, of each radial support member 28 continuously increases as the radial support member 28 extends in a radially outward direction from the central cavity 22. In addition, each radial support member 28 has a width, W, that varies along its length, as shown in FIG. 4. Specifically, the width, W, continuously decreases as the radial support member 28 extends in a radially outward direction from the central cavity 22. As shown in FIGS. 5-7, each radial support member 28 has an internal cavity 36 to reduce the overall weight of the rotary cutting tool 10, while maintaining the stiffness of the rotary cutting tool 10. In this manner, the radial support members 28 have a three-dimensional topology that maximizes a stiffness-to-weight ratio of the rotary cutting tool.

The rotary cutting tool 10 further includes a plurality of peripheral support members 38 extending along the peripheral outer surface 14 of the disc-like central body 12. A portion of the peripheral support member 38 extends to the insert pocket 30 and fully supports the insert pocket 30 against all forces and is the primary support for the insert pocket 30. In addition, the peripheral support member 38 structurally interacts with the radial support member 28 to provide additional support for the insert pocket 30 against centrifugal and cutting forces exerted on the cutting insert 32 during a cutting operation.

In the illustrated embodiment, the rotary cutting tool 10 has a total of four peripheral support members 38 and four insert pockets 30 (i.e., a one-to-one correspondence). However, it will be appreciated that the invention is not limited to the number of peripheral support members 38 and insert pockets 30, and that the invention can be practiced with any desirable number of peripheral support members 38 and insert pockets 30, depending on the dimensions of the rotary cutting tool 10 and application requirements.

Each peripheral support member 38 is a continuous surface extending on both sides of the insert pocket 30 with a leading portion 38a with respect to the direction of rotation, R, of the rotary cutting tool 10 and a trailing portion 38b with respect to the direction of rotation, R, of the rotary cutting tool 10. The leading portion 38a has a chip gash 40 to assist in the evacuation of chips during a cutting operation.

As shown in FIG. 2, each peripheral support member 38 has a varying cross section in multiple directions. Specifically, using a cylindrical coordinate system with the axial direction (Z axis) in line with the central axis, $C_L$, to describe the shape of the peripheral support member 38, the cross-sectional area in the r-Z plane decreases as the peripheral support member 38 extends tangentially away ($\theta$ direction) from the insert pocket 30. In the $\theta$-Z plane, the height of the cross section increases while the width of the cross section decreases as the peripheral support member 38 extends in the positive R direction away from the central axis, $C_L$, resulting in a net decrease in cross sectional area. The cross-sectional area decreases in the r-$\theta$ plane (top view) as the peripheral support member 38 extends in the Z direction away from the disc-like central body 12. The thickness of the peripheral support member 38 is much wider near the disc-like central body 12 and the shape essentially tapers as the peripheral support member 38 approaches the vicinity of the insert pocket 30. This distribution of material results in a higher stiffness to weight ratio for the peripheral support member than conventional designs.

As shown in FIGS. 6-9, each peripheral support member 38 has an internal cavity 42 to reduce the overall weight of the rotary cutting tool 10, while having a minimal effect on the stiffness of the rotary cutting tool 10. In this manner, the peripheral support members 38 have a three-dimensional topology that maximizes a stiffness-to-weight ratio of the rotary cutting tool 10.

As described above, the rotary cutting tool 10 has a single radial support member 28 (i.e., a one-to-one correspondence) for providing additional support of the insert pocket 30, while increasing the stiffness-to-weight ratio of the rotary cutting tool 10. However, it will be appreciated that the disclosure is not limited by the number of radial support members 28 for supporting each insert pocket 30, and that the invention can be practiced with any desirable number of radial support members 28 for supporting each insert pocket 30.

Referring now to FIGS. 10-13, a rotary cutting tool 10' is shown according to another embodiment of the disclosure. In general, the rotary cutting tool 10' is substantially identical to the rotary cutting tool 10, except that the rotary cutting tool 10' has a second radial support member 44 for supporting the insert pocket 30.

Figure 10:
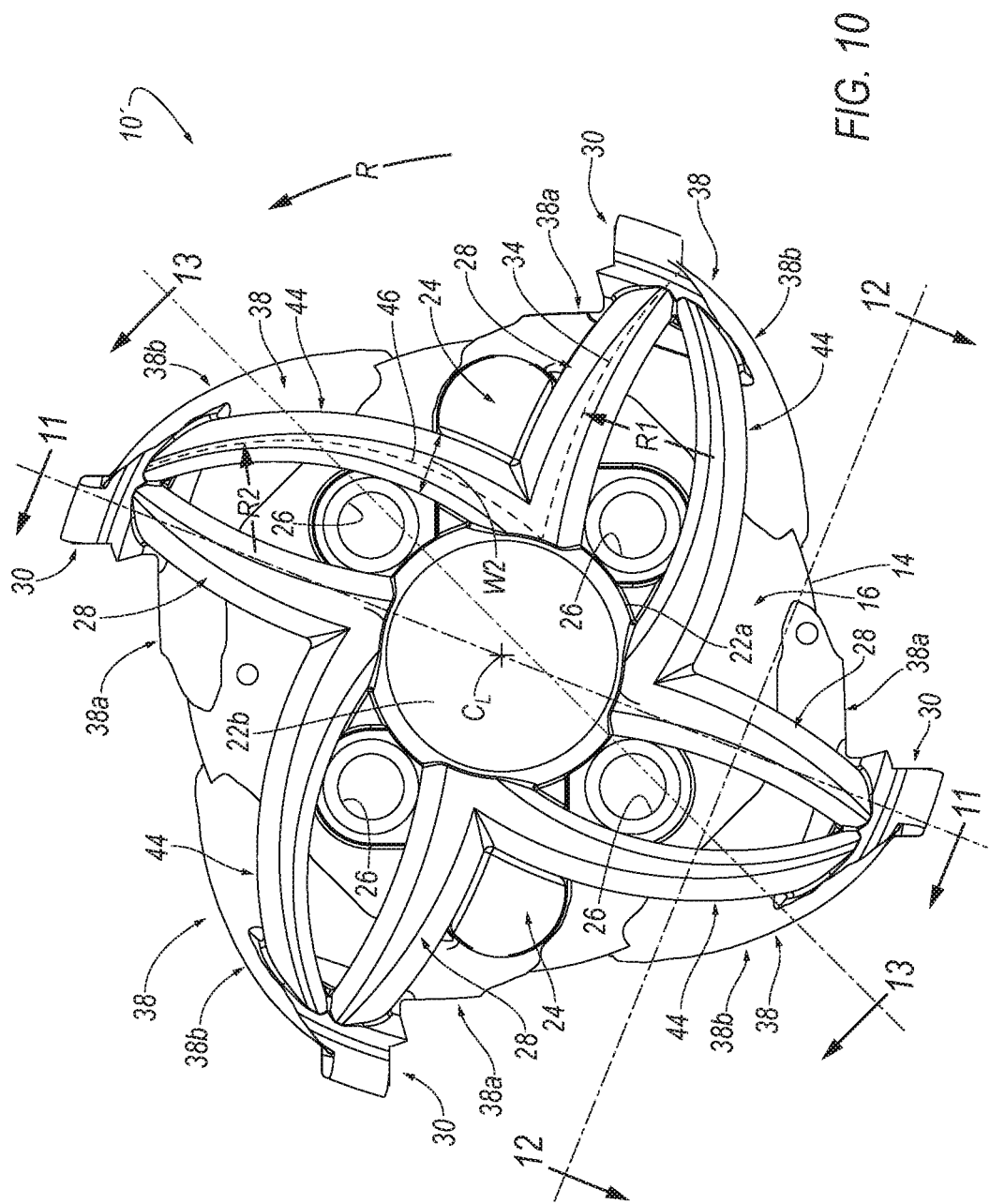
FIG. 10 is a front view of a rotary cutting tool according to another embodiment of the disclosure.
Figure 11:
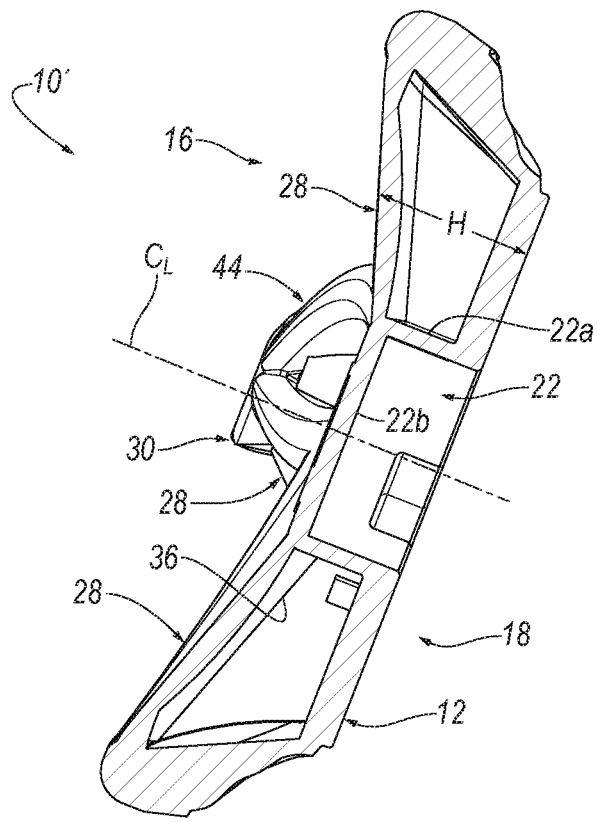
FIG. 11 is a cross-sectional view of the rotary cutting tool taken along line 11-11 of FIG. 10.

As shown in FIG. 10, each second radial support member 44 has a central line 46 with a radius of curvature, R2. Unlike the central line 34 of the radial support member 28 that curves away from the direction of rotation, R, the central line 46 of the second radial support member 44 is curved toward the direction of rotation, R, of the rotary cutting tool 10'. In the illustrated embodiment, a portion of one end of the second radial support member 44 extends from the side wall 22a of the central cavity 22 and an adjacent, downstream radial support member 28 to the vicinity of the insert pocket 30.

Figure 12:
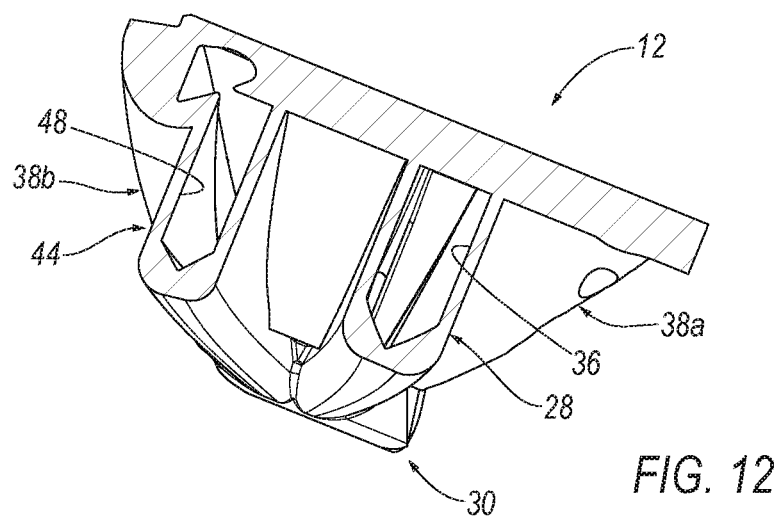
FIG. 12 is a cross-sectional view of the rotary cutting tool taken along line 12-12 of FIG. 10.
Figure 13:
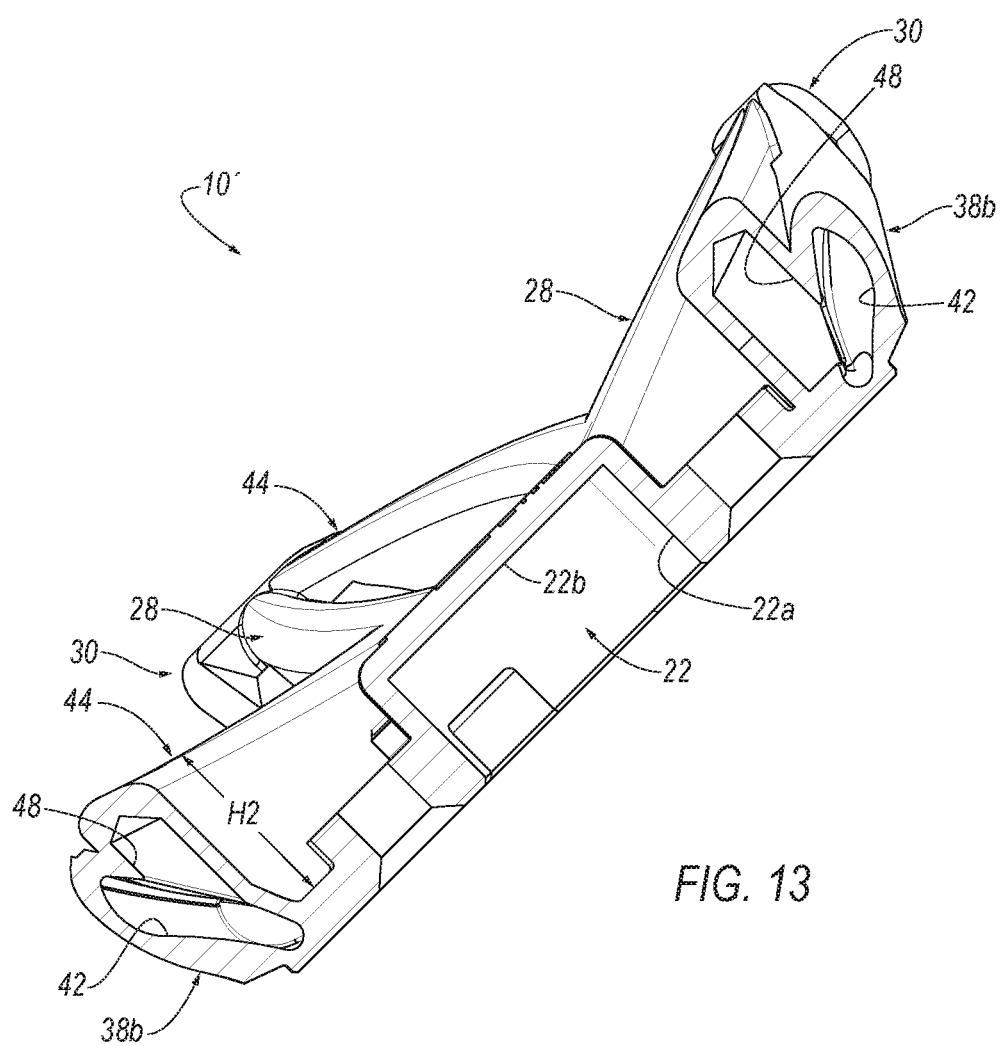
FIG. 13 is a cross-sectional view of the rotary cutting tool taken along line 13-13 of FIG. 10.

As shown in FIG. 13, each second radial support member 44 has a height, H2, that varies along its length. Specifically, the height, H2, continuously increases as the radial support member 44 extends away in a radially outward direction from the central cavity 22. In addition, each second radial support member 44 has a width, W2, that varies along its length, as shown in FIG. 10. Specifically, the width, W2, continuously decreases as the radial support member 44 extends away in a radially outward direction from the central cavity 22. As shown in FIGS. 12 and 13, each second radial support member 44 has an internal cavity 48 to reduce the overall weight of the rotary cutting tool 10', while having a minimal effect on the stiffness of the rotary cutting tool 10. In this manner, the second radial support members 44 have a three-dimensional topology that maximizes a stiffness-to-weight ratio of the rotary cutting tool 10'.

The rotary cutting tools 10 and 10' have a normalized resultant stiffness to weight ratios of about 1.4-1.5, as compared to a conventional rotary cutting tool, while decreasing the mass by about 40-60%. As a result, the resultant stiffness to weight ratio of the rotary cutting tools 10 and 10' is 40-50% greater than a conventional rotary cutting tool while the mass is about 50% less. The normalized stiffness to weight ratio varies in the tangential, radial, and axial directions and can be anywhere from 1.1 to greater than 2 times greater than a conventional tool.

Having described presently preferred embodiments the disclosure may be otherwise embodied within the scope of the appended claims.

What is claimed is:

1. A rotary cutting tool, comprising:
    a disc-like central body having an outer peripheral surface;
    a peripheral support member extending circumferentially along the peripheral outer surface of the disc-like central body, the peripheral support member providing support against centrifugal and cutting forces exerted on an insert pocket during a cutting operation; and
    a radial support member extending radially along the disc-like central body to the peripheral support member,
    wherein the radial support member structurally interacts with the peripheral support member to provide additional support for the insert pocket against centrifugal and cutting forces exerted on the insert pocket during a cutting operation,
    wherein the radial support member and the peripheral support member have a three-dimensional topology.

2. The rotary cutting tool according to claim 1, wherein the radial support member has a central line that is curved away from a direction of rotation of the rotary cutting tool.

3. The rotary cutting tool according to claim 1, wherein the radial support member has a height that varies along its length.

4. The rotary cutting tool according to claim 3, wherein the height of the radial support member increases as the radial support member extends in a radially outward direction.

5. The rotary cutting tool according to claim 1, wherein the radial support member has a width that varies along its length.

6. The rotary cutting tool according to claim 5, wherein the width of the radial support member decreases as the radial support member extends in a radially outward direction.

7. The rotary cutting tool according to claim 1, wherein the disc-like central body further comprises a coupling interface.

8. The rotary cutting tool according to claim 7, wherein the coupling interface includes a central cavity and a keyway extending radially outward from the central cavity.

9. The rotary cutting tool according to claim 1, wherein the peripheral support member comprises a continuous surface extending on both sides of the insert pocket with a leading portion with respect to a direction of rotation, R, of the rotary cutting tool and a trailing portion with respect to the direction of rotation, R, of the rotary cutting tool.

10. The rotary cutting tool according to claim 1, wherein the peripheral support member has an internal cavity.

11. The rotary cutting tool according to claim 1, wherein the peripheral support member has a varying thickness in multiple directions.

12. The rotary cutting tool according to claim 11, wherein a thickness of the peripheral support member is largest proximate the disc-like central body and smallest proximate the insert pocket.

13. A rotary cutting tool, comprising:
    a disc-like central body having an outer peripheral surface;
    a peripheral support member extending along the peripheral outer surface of the disc-like central body,
    wherein the peripheral support member comprises a continuous surface extending on both sides of an insert pocket with a leading portion with respect to a direction of rotation, R, of the rotary cutting tool and a trailing portion with respect to a direction of rotation, R, of the rotary cutting tool, and
    a radial support member extending radially along the disc-like central body to the peripheral support member for providing additional support for the insert pocket against centrifugal and cutting forces exerted on the insert pocket during a cutting operation,
    wherein the radial support member structurally interacts with the peripheral support member to provide additional support for the insert pocket against centrifugal and cutting forces exerted on the insert pocket during a cutting operation,
    wherein the peripheral support member has a three-dimensional topology.

14. The rotary cutting tool according to claim 13, wherein the peripheral support member has an internal cavity.

* * * * *